May 3, 1960 K. C. ROCK 2,935,650
PHOTOGRAPHIC FLASH APPARATUS
Filed Dec. 29, 1958
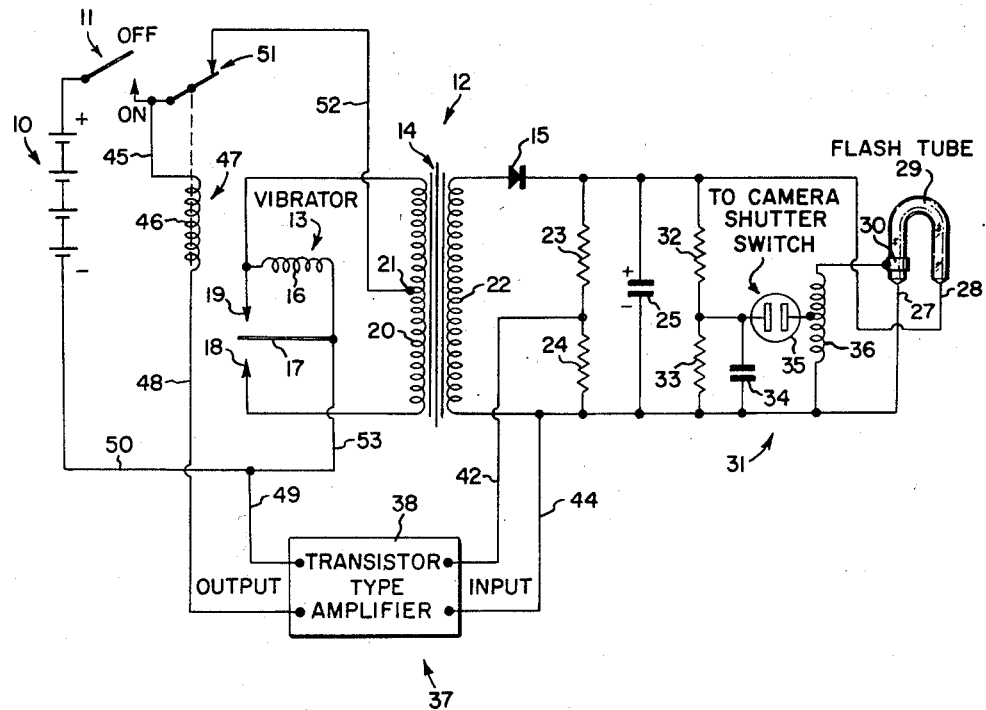
INVENTOR.
KINGSLEY C. ROCK
BY
ATTORNEY

United States Patent Office

2,935,650
Patented May 3, 1960

2,935,650

PHOTOGRAPHIC FLASH APPARATUS

Kingsley C. Rock, Littleton, Colo., assignor to Minneapolis-Honeywell Regulator Company, Minneapolis, Minn., a corporation of Delaware Application December 29, 1958, Serial No. 783,407

2 Claims. (Cl. 315—241)

The present invention is concerned with an improved electric apparatus and more particularly with an electrical apparatus for the charging of a capacitor to a high voltage from a low voltage source.

Such an electrical apparatus is of particular utility in the field of electronic photographic flash units wherein a low voltage source, usually batteries, is connected to voltage transforming means to provide a high voltage which charges a flash capacitor. This flash capacitor is arranged to be selectively discharged through a source of illumination to provide a brilliant flash of light for photographic purposes. In apparatus such as this it is desirable to conserve the energy in the low voltage batteries, to thereby increase their life. As will be appreciated, once the above mentioned flash capacitor is charged to the given value, which value is necessary to produce a controlled quantity of light, the continued charging of the capacitor results in wasted energy and thereby a reduced number of flashes from the battery.

The present invention is concerned with an improved means of conserving battery energy. Specifically, the arrangement of the present invention provides means which responds to the state of charge of the capacitor and controls the voltage transforming means which charges this capacitor. In other words, once the capacitor has received the given state of charge, the battery energy drain is reduced and the life of the battery is thereby extended. Furthermore, the present invention functions upon either the gradual leaking off of the charge on the flash capacitor or the discharging when a flash of light is produced to render the voltage transforming means operative to once again recharge this capacitor. In this manner, the apparatus of the present invention automatically controls the state of charge of the flash capacitor to give optimum length of life to the low voltage battery being used in the apparatus.

The present invention will be apparent upon reference to the following specification, claims, and drawing, of which the single figure is a schematic representation of a preferred embodiment of the present invention.

Referring specifically to this single figure, the reference numeral 10 identifies a low voltage source in the form of a plurality of series connected batteries. For example, these batteries may be four D-type dry cell photoflash batteries.

The operation of the electrical apparatus is controlled by means of an on-off switch 11, shown in its off position. By means of this switch 11, the source 10 is connected to voltage transforming means identified by the reference numeral 12.

This voltage transforming means 12 includes a vibrator 13, a transformer 14, and a diode 15. Vibrator 13 is provided with an actuating winding 16, a movable reed 17 controlled by winding 16, and stationary contacts 18 and 19.

Transformer 14 includes a primary winding 20 having a tap 21 and also includes a relatively high voltage secondary winding 22.

The voltage induced in secondary winding 22 is rectified by diode 15 and is applied to a network including resistor 23, resistor 24, and flash capacitor 25. In this manner, flash capacitor 25 is charged. This capacitor is directly connected to the main electrodes 27 and 28 of a photographic flash tube 29.

Flash tube 29 is of the gas filled variety and is provided with a triggering or starting electrode 30 which is controlled by a triggering circuit identified by the reference numeral 31. This triggering circuit includes a bleeder resistor network having resistors 32 and 33 connected across capacitor 25 and having a trigger capacitor 34 connected to be charged by the voltage present across resistor 33. The reference numeral 35 designates contact members adapted to mate with a cord which extends to the shutter switch of a camera. Upon closing of this switch, the operation of the electrical apparatus is synchronized with that of the camera shutter and the trigger capacitor 34 is discharged through a trigger coil 36. The voltage induced in the winding of trigger coil 36 applies a high voltage between the main electrode 27 and the trigger electrode 30 of the flash tube, and in this manner the gas within the flash tube is ionized and capacitor 25 quickly discharges through this flash tube to produce a brilliant flash of light.

The apparatus of the present invention provide electrical means identified by the reference numeral 37 which controls the charge on capacitor 25 by controlling the operativeness of the voltage transforming means 12. Specifically, a conventional transistor amplifier 38 is provided having an input connected to conductors 42 and 44. It will be recognized that other electrical means could be readily substituted for the transistor amplifier 38, for example, a vacuum tube amplifier.

As the charge builds up on capacitor 25, the voltage across resistor 24 also increases and this voltage, which is indicative of the state of charge of capacitor 25, is effective to control the input of amplifier 38. The output of amplifier 38 can be traced from the upper terminal of the source 10 through switch 11, conductor 45, coil 46 of a relay 47, conductor 48, output of amplifier 38, and conductors 49 and 50 to the lower terminal of source 10. Relay 47 controls a normally closed switch 51 which is connected in controlling relation to the voltage transforming means 12. Specifically, energization of relay 47 causes switch 51 to open and disconnects the source 10 from the vibrator 13.

*Operation*

Considering the operation of the improved electrical apparatus in greater detail, upon the on-off switch being closed, a circuit can be traced from the upper terminal of battery 10 through switch 11, switch 51, conductor 52, the upper portion of primary 20, winding 66, and conductors 53 and 50 to the lower terminal of source 10. This circuit not only energizes the upper portion of primary winding 20, but also energizes winding 16 causing reed 17 to move into engagement with stationary contact 19.

When reed 17 engages contact 19, winding 16 is deenergized and therefore reed 17 is released. Reed 17 returns to the position shown on the drawing and overshoots this position to engage the stationary contact 18. A circuit can now be traced from the tap 21 of the primary winding 20 through the lower portion of this primary winding, contact 18, reed 17, and conductors 53 and 50 to the lower terminal of source 10. In this manner, the lower half of the primary winding 20 is energized and the current flow in this portion of the primary winding is opposite to that which was above traced through the upper portion of the primary winding. This above described action is cyclically repeated and in this manner an alternating voltage of relatively high magnitude is induced in the secondary winding 22. This alternating voltage is then rectified by diode 15 and is applied to the network including resistors 23, 24, and flash capacitor 25. The flash capacitor 25 is accordingly charged such that its lower plate is negative with respect to its upper plate, as shown.

Upon capacitor 25 becoming charged, the voltage present across resistor 24 causes a control voltage to be applied to the input of amplifier 38. An output current now flows through the above traced circuit including the winding 46 of relay 47 and the battery 10. In this manner, relay 47 is energized in accordance with the state of charge of capacitor 25. Specifically, upon capacitor 25 being charged to a given value, relay 47 is energized.

The energization of relay 47 causes switch 51 to open and break the circuit which connects the low voltage source 10 to the transforming means 12 including the vibrator 13. Since relay switch 51 is not in the circuit connecting relay 46 and amplifier 38 to battery 10, the relay and amplifier 38 remain connected to battery 10. This is the condition which the apparatus assumes once capacitor 25 has been charged as required. The photographer may now cause this capacitor to discharge through the flash tube 29 to produce a brilliant flash of light by means of the shutter contacts on the associated camera with which the apparatus is adapted to be used.

Once capacitor 25 is charged, the electrical energy stored in this capacitor gradually is dissipated through associated networks including resistors 23, 24, 32 and 33. Therefore, the voltage supplied to the input of amplifier 38 gradually decreases to the point where current no longer flows through its output circuit and relay 47 is de-energized to again close switch 51. The voltage source 10 is then reconnected to the voltage transforming means and capacitor 25 is recharged.

From the above description it can be seen that I have provided an improved electrical apparatus wherein the low voltage source 10 is connected to the low voltage input of a voltage transforming means 12 whose high voltage output is connected to a capacitor 25 and wherein electrical responsive means in the form of amplifier 38 is effective to be controlled by the charge on capacitor 25 and to in turn control the energization of relay 47 which by means of a switch 51 controls the connection of source 10 to the input of the voltage transforming means 12. In this manner, capacitor 25 is maintained at a controlled charge condition with a minimum of energy drawn from source 10.

Other modifications of the present invention will be apparent to those skilled in the art and it is therefore intended that the scope of the present invention be limited solely by the scope of the appended claims.

I claim as my invention:

1. A photographic flash apparatus, comprising: a low voltage battery, a voltage transformer having a low voltage primary winding and a high voltage secondary winding, first-circuit means connecting said low voltage battery to said low voltage primary, an electrically operated current interrupting device for periodically interrupting the connection by said circuit means of said battery to said primary winding to cause said primary winding to induce a high voltage in said secondary winding, said electrically operated current interrupting device being connected to said battery so as to be energized thereby, a capacitor, second circuit means connecting said capacitor to the secondary winding of said transformer, a gas filled flash tube, further circuit means connecting said flash tube to said capacitor, means for causing said flash tube to fire and said capacitor to discharge through said tube to thereby produce a flash of light, an amplifier having an input and an output, circuit means connecting the input of the amplifier to said capacitor, a relay having an energizing winding and contacts movable from a first to a second position upon energization of said winding, and means for connecting said battery and the output of said amplifier in series with said relay winding so as to control the energization of said relay winding from said battery in accordance with the output of said amplifier, said contacts being connected into said first circuit means and effective when in said first position to maintain said battery connected with said electrically operated current device and with said primary winding under the control of said device, said contacts being effective in said second position to interrupt the connection of said battery with both said primary winding and the electrically operated current interrupting device but not to interrupt the connection of said battery to said relay winding and said amplifier, said amplifier being effective upon said condenser being charged to a desired value to cause said relay winding to be energized to cause said contacts to move to said second position to maintain said amplifier and relay energized but to eliminate current drain from said battery by reason of the continued charging of said condenser and the continued operation of said current interrupting device.

2. A photographic flash apparatus, comprising; a low voltage battery, a voltage transformer having a low voltage primary winding and a high voltage secondary winding, first-circuit means connecting said low voltage battery to said low voltage primary, a vibrator for periodically interrupting the connection by said circuit means of said battery to said primary winding to cause said primary winding to induce a high voltage in said secondary winding, said vibrator including an actuating winding and a switch operated thereby, said actuating winding being connected to said battery so as to be energized thereby, a capacitor, second circuit means connecting said capacitor to the secondary winding of said transformer, a gas filled flash tube, further circuit means connecting said flash tube to said capacitor, means for causing said flash tube to fire and said capacitor to discharge through said tube to thereby produce a flash of light, a transistor amplifier having an input and an output, circuit means connecting the input of the amplifier to said capacitor, a relay having an energizing winding and contacts movable from a first to a second position upon energization of said winding, and means for connecting said battery and the output of said amplifier in series with said relay winding so as to control the energization of said relay winding in accordance with the output of said amplifier, said contacts being connected into said first circuit means and effective when in said first position to maintain said battery connected with the actuating winding of said vibrator and with said primary winding under the control of said vibrator, said contacts being effective in said second position to interrupt the connection of said battery with both said primary winding and the actuating winding of said vibrator but not to interrupt the connection of said battery to said relay winding and said amplifier, said amplifier being effective upon said condenser being charged to a desired value to cause said relay winding to be energized to cause said contacts to move to said second position to maintain said amplifier and relay energized but to eliminate current drain from said battery by reason of the continued charging of said condenser and the continued operation of said vibrator.

References Cited in the file of this patent

UNITED STATES PATENTS

| | | |
|---|---|---|
| 2,469,913 | Basham | May 10, 1949 |
| 2,495,301 | Wengel | Jan. 24, 1950 |
| 2,763,813 | McKinney | Sept. 18, 1956 |

FOREIGN PATENTS

| | | |
|---|---|---|
| 664,516 | Great Britain | Jan. 9, 1952 |